June 18, 1957     E. M. ZINKE     2,795,832
HOOK
Filed June 22, 1953
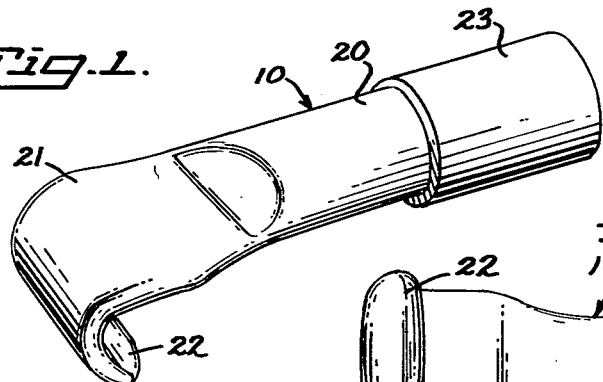
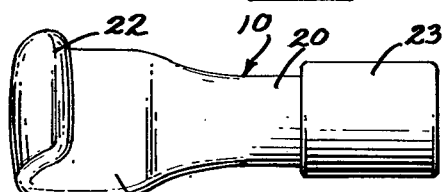
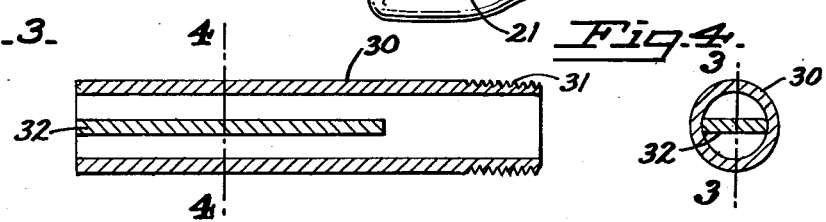
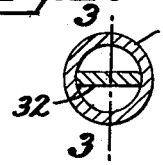
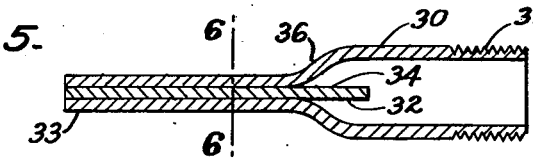
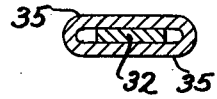
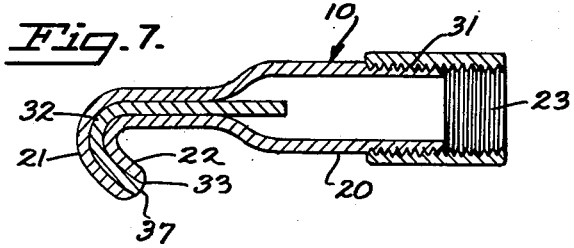
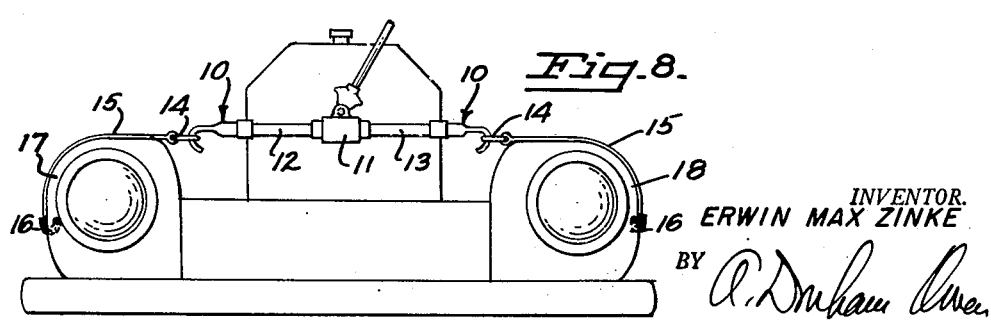
INVENTOR.
ERWIN MAX ZINKE
BY
ATTORNEY United States Patent Office 2,795,832
Patented June 18, 1957

2,795,832
HOOK

Erwin Max Zinke, Sonoma, Calif.

Application June 22, 1953, Serial No. 363,125

5 Claims. (Cl. 24—230.5)

This invention relates to an improved fitting for use with automobile body repair tools. More particularly, it relates to a fitting of the type having at one end a curved hook that is flattened in cross section and at the opposite end a coupling member by which it may be secured to a jack or the like. The invention also relates to the method of manufacturing the improved fitting.

Among the tools which are used to repair automobile bodies, one of the most useful is a jack which can exert pulling and pushing force where needed. The present invention is adapted for attachment to the jack when a pulling force is employed, and it serves as a fitting that can hook on or engage any of several types of tools which are themselves connected with the automobile body. The present invention provides a fitting whose novel structure has solved the problem of providing a strong hook-type connection, and a novel method for manufacturing it makes this strong hook-type fitting relatively inexpensive and simple to manufacture in quantity in a variety of lengths.

The novel method for making the hook-fitting starts with the insertion of a flat bar of tool steel in one end of a piece of round steel pipe, the bar extending in for a substantial portion of the pipe's length and being practically coterminous with its outer end. Preferably the width of the bar is almost as great as the inside diameter of the pipe. Next the pipe is flattened at its outer end so that both its sides snugly engage the sides of the flat bar of tool steel. Then this flattened outer end is formed into a curve, this operation simultaneously serving to tighten the connection between the bar and pipe and to provide a strong hooked end.

The resultant product is a fitting for automobile body repair tools having a very strong curved hook at one end, the hook being flattened in cross section, and comprising a sandwich of a tool steel bar between the steel sides of the closed unitary flattened pipe. The opposite end of the device remains round and may be threaded to provide a coupling member or it may be provided with another type of connection.

Other objects and advantages of the present invention will appear from the following description of a preferred embodiment given in accordance with 35 U. S. C. 112 to serve as an illustrative embodiment and not for the purpose of narrowly limiting the invention.

In the drawings:

Fig. 1 is a view in perspective of a fitting embodying the present invention;

Fig. 2 is a bottom plan view of the fitting shown in Fig. 1;

Fig. 3 is a view in section taken along the line 3—3 in Fig. 4 and showing the first stage of manufacture of the fitting, in which a flat bar of tool steel is inserted in a section of round pipe;

Fig. 4 is a view taken along the line 4—4 of Fig. 3, showing the bar fitting snugly across the diameter of the pipe;

Fig. 5 is a view similar to Fig. 3 showing the next stage in the manufacture of the fitting member, in which the pipe walls are flattened to lie against the flat walls of the bar;

Fig. 6 is a view in section taken along the line 6—6 of Fig. 5;

Fig. 7 is a view similar to Figs. 3 and 5, showing the completed fitting member in which a portion of the flattened end is curved to form a hook, and in which a threaded coupling sleeve has been threaded around the round end;

Fig. 8 is a somewhat diagrammatic view in elevation showing how the hooks may be attached to a jack and used to pull two belt members which are secured at their opposite ends to the edge of automobile fenders.

In Fig. 8 the two fittings 10 embodying the present invention are on opposite sides of a jack 11, one fitting 10 being coupled to an extension member 12 which is secured rigidly to the jack housing, and the other fitting being coupled to the end of the movable jack rod 13. When the jack 11 is operated to move the rod 13 toward the left-hand side of Fig. 8, the two hooks 10 are pulled in toward each other. Each hook 10 engages an anchor-buckle 14 which is fastened on one end of a belt 15, and the other end 16 of each belt 15 is attached to an automobile fender 17 or 18.

Other uses for the hook 10 will be apparent to body repairmen. It is also apparent that great stress may be exerted on the hook fittings 10, especially at the hook proper, so the device needs to be very strong in proportion to its size and weight. The present invention has solved this problem.

Figs. 1 and 2 show a completed fitting 10 of this invention. One end 20 is round in cross-section, and the opposite end 21 is flattened in cross-section and is curved to provide the hook or gripping portion 22 of the fitting 10. A collar or coupler sleeve 23 may be threaded around the round end 20, or other types of connection means may be used to attach the fitting 10 to the jack 11 or other member.

The internal structure of the fitting 10 will become more apparent from a description of the novel method by which the fitting 10 is manufactured. A round section of pipe 30, preferably threaded at one end 31, is first cut to the desired length. Although steel pipe is strong for its weight, it is not strong enough for the hook, because it would either break or uncurl under heavy stress, depending on its malleability.

This invention overcomes this defect and at the same time avoids the expensive alternative of having to prepare specially tempered fittings having the desired shape, by incorporating into a combination with the pipe 30, a flat bar 32 of tool steel; i. e., a tough steel that has a strong resistance to bending. Preferably, the bar corresponds substantially in width to the inner diameter of the pipe 30 and is substantially shorter than the pipe 30. The bar 32 is inserted from the outer non-threaded end 33 of the pipe in toward the threaded end, stopping short of the outer end so as not to interfere with the coupling but extending in for a somewhat greater distance than the portion 21 of the pipe which is to be flattened. The appearance at this stage is shown in Figs. 3 and 4, and it will be seen that when the dimensions of the bar 32 and pipe 30 are properly chosen, they will fit snugly together so that there is no need to weld them together.

As Figs. 5 and 6 show, the next step is to flatten the end 33 by forcing in the pipe walls snugly against each side of the bar 32 for most of the bar's length. The fitting 10 may have a longer round shank than is shown, and is, at any rate, flattened over only a portion of the length of the bar 32, so that at least a small inner end portion 34 of the bar 32 still extends into the cylindrical portion 20 of the fitting 10. At the flattened portion 21, both of the flat sides of the bar 32 are completely bounded by and snugly held between the pipe wall, and the pipe wall is flat for a small distance 35 on both sides of the bar (see Fig. 6). It will also be noticed from Fig. 5 that there is an intermediate partially flattened tapered portion 36 between the fully rounded portion 20 and the fully flattened portion 21.

Next, the rounded hook 22 is formed by bending a portion of the flat portion 21 so that the device then appears as in Figs. 1, 2, and 7, and the tool steel bar 32 is then held even more firmly in the fitting. After this operation has been performed, it may be desirable to fuse the outermost end 37 of the fitting by welding or brazing, and to cadmium plate the outer wall of the fitting or otherwise finish or galvanize it. The coupling member 23, which may then be attached, is not absolutely necessary but is desirable for attaching it to other fittings having exterior threads.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A fitting for automobile body repair tools and the like including in combination an integral hollow tubular member with its walls round in cross-section at one end to define a round portion and provided there with coupling means, and flattened in cross-section at its other end to define a flattened portion, the flattened portion being curved into a hook; and a narrow flat bar of tool steel generally rectangular in cross section inside part of said tubular member extending the full length of said flattened portion into a part of the round portion, said tube walls in said flattened portion lying snugly against the flat walls of said bar.

2. A fitting for automobile body repair tools and the like including in combination a length of hollow tubular steel pipe with its walls at one end round in cross-section and threaded to provide a coupling means, and the other end flattened in cross-section, and curved into a hook; and a narrow flat bar of tool steel rectangular in cross-section inside said pipe extending from said flattened end through and beyond the full length of said flattened portion, said flattened pipe walls lying snugly against the flat walls of said bar so as to clamp said bar between them, to provide thereby a laminated metal hook, said bar also lying snugly in a portion of the round portion of said pipe, extending diametrically across said pipe, and having side edges engaging portions of the interior pipe walls.

3. The product of claim 2 in which the outer hooked end is fused to provide smoothness.

4. A method of making a hook-type fitting for automobile body repair tools and the like, comprising the steps of: inserting into a length of steel tubing a narrow flat rectangular-sectioned bar of tool steel whose width is substantially the same as the inner diameter of said tubing, said bar being inserted so as to extend from one end of said pipe toward but short of its opposite end; flattening the walls of said tubing at one end thereof against said bar for a substantial portion of the bar's length; and then curving the outer flattened end to form a hook portion at that end.

5. A method of making a fitting for automobile body repair tools, comprising the steps of: inserting into a length of steel pipe a flat bar of tool steel whose width is substantially the same as the inner diameter of said pipe, said bar being inserted so as to extend from one end of said pipe toward but short of its opposite end; flattening the walls of said pipe against said bar for a substantial portion of its length extending from the end in which said bar is inserted to a point short of the opposite end of said bar; curving the end of the flattened portion to form a hook portion at that end; and fusing the bar and pipe together at the end of said hook.

References Cited in the file of this patent

UNITED STATES PATENTS

| Number | Name | Date |
| --- | --- | --- |
| 474,675 | Milne | May 10, 1892 |
| 1,248,830 | Dunham | Dec. 4, 1917 |
| 1,344,533 | Cole | June 22, 1920 |
| 1,420,669 | Schutte | June 27, 1922 |
| 1,465,895 | Daniels | Aug. 21, 1923 |
| 1,753,638 | Axtell | Apr. 8, 1930 |
| 1,792,489 | Gilmore | Feb. 17, 1931 |
| 2,026,982 | Kinison | Jan. 7, 1936 |
| 2,059,825 | Talbot | Nov. 3, 1936 |
| 2,247,041 | Bergan | June 24, 1941 |
| 2,317,072 | Martin | Apr. 20, 1943 |
| 2,427,176 | Aldeen | Sept. 9, 1947 |
| 2,700,398 | Green | Jan. 25, 1955 |